United States Patent

[11] 3,617,997

[72] Inventors: Heinrich Maass, Bremen St. Magnus; Reinhard Wilhelm Leisterer, Bremen, both of Germany
[21] Appl. No.: 888,510
[22] Filed: Dec. 29, 1969
[45] Patented: Nov. 2, 1971
[73] Assignee: Fried Krupp Gesellschaft mit beschrankter Haftung, Essen, Germany
[32] Priority: Nov. 16, 1967
[33] Germany
[31] P 16 23 376.4
Continuation of application Ser. No. 775,477, Nov. 13, 1968, now abandoned.

[54] DISPLAY DEVICE FOR TARGET POSITION-FINDING APPARATUS
5 Claims, 1 Drawing Fig.

[52] U.S. Cl. .................................................. 340/3 R, 340/3 D, 343/5 CD, 343/7.7
[51] Int. Cl. .................................................. G01s 9/66
[50] Field of Search ......................................... 340/3, 3 C, 3 D; 343/5 CD, 7.7, 8, 9

[56] References Cited
UNITED STATES PATENTS

| | | | |
|---|---|---|---|
| 2,508,358 | 5/1950 | Ayres | 343/11 |
| 3,121,856 | 2/1964 | Finney | 340/3 |
| 3,156,110 | 11/1964 | Clynes | 73/67.8 |
| 3,307,142 | 2/1967 | Doebler | 340/3 |

Primary Examiner—Richard A. Farley
Attorney—Spencer & Kaye

ABSTRACT: A display device for target position-finding apparatus of the type employing echo signals, which displays a true map-scale image of targets on a cathode ray tube screen. According to the invention, a color picture tube is used as the cathode-ray tube and its three color guns are respectively supplied with the echo signals from radially stationary, advancing and receding targets.

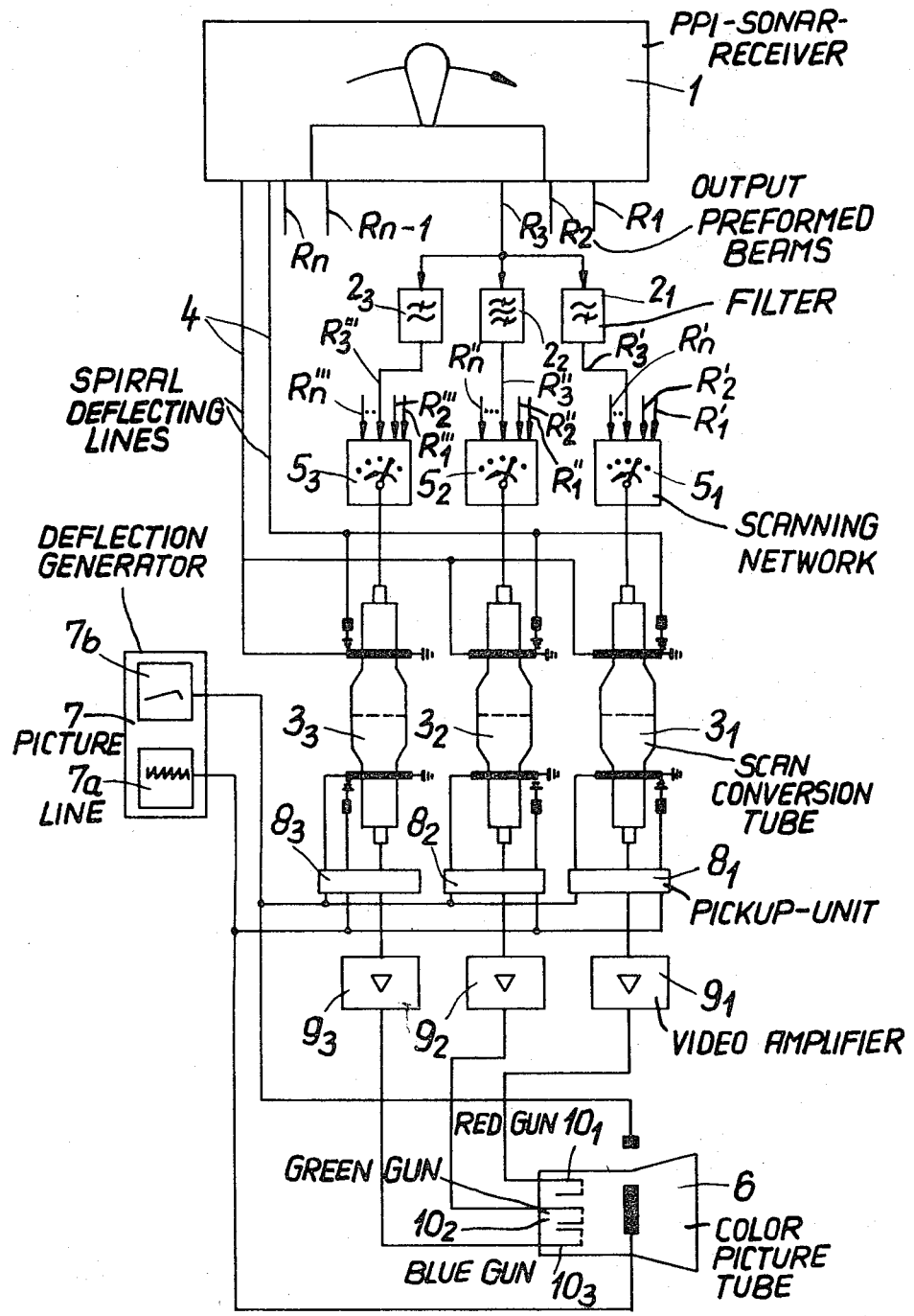

DISPLAY DEVICE FOR TARGET POSITION-FINDING APPARATUS

The present application is a continuation of copending application Ser. No. 775,477, filed Nov. 13, 1968.

CROSS-REFERENCE TO RELATED APPLICATIONS

The subject matter of this application is related to that disclosed in copending application Ser. No. 784,962, filed Aug. 5, 1968, of Werner Schwarz, Reinhard W. Leisterer, Herwig Meyerhoff and Gunter Berkelmann.

BACKGROUND OF THE INVENTION

The present invention relates to target position-finding apparatus, such as sonar or radar, of the type employing echo signals to display a true map-scale image of targets on a cathode-ray tube screen. The apparatus according to the present invention provides a color display of information derived from the Doppler shift of the echo signals.

When the positions of distant targets or objects are located with the aid of acoustic or electromagnetic waves and the echo images recorded in true map-scale fashion with a so-called plan position indicator (PPI) display, the echoes returning from the reflecting objects are displayed according to azimuth and distance with the intensity of the display dependent on the echo amplitude. When strong echoes are reflected and received from stationary surroundings (in particular, as ground or sea clutter echoes — often called "reverberation" in the sonar art), it is difficult to separate the echoes from an individual effective target from the background echoes from the surroundings.

Methods have been developed in the radar art for separating the echoes from moving targets from those of stationary targets by comparison of a plurality of successive pulses. These methods, commonly known in the art as "moving target indication" are described, for example, by A. G. Emslie and R. A. McConnel in *MIT Radiation Laboratory Series*, Vol. 1, 1947, Chapter 16, beginning at page 626.

Because of the far lower speed of propagation of acoustic signals, other methods have been employed in the sonar art to separate the moving from the stationary targets. These methods rely on the Doppler shift in the frequency of the echo signals produced by the radial component of velocity of the moving targets. The echo signals which exhibit a Doppler shift are separated from the non-Doppler-shifted echoes of stationary targets by means of suitable circuit apparatus, such as frequency discriminators, and displayed on a screen in various ways. For example, the Doppler shift as well as the distance of the target have been displayed in rectangular coordinates on a black and white cathode-ray tube screen with the values of Doppler shift, and distance, on the abscissa and ordinate, respectively.

One such apparatus which employs these frequency discriminators is described in the German Pat. No. 1,135,344; in this apparatus a system of revolving glow lamps is used in the display so that the Doppler and distance information appears in polar coordination. In still further devices the same basic circuit is used to display the Doppler shift and distance in cartesian coordinates.

In all of the sonar display apparatus of the kind just described, it is possible to display the Doppler information of a target out of only one selected azimuth direction at a time.

SUMMARY OF THE INVENTION

It is an object of the present invention, therefore, to find a way to display targets on a cathode-ray tube screen in true map scale fashion, in such a way that all echo signals having a Doppler shift may be separated from the signals without a Doppler shift and the latter may be suppressed in the display to any desired degree.

This object, as well as other objects which will become apparent in the discussion that follows, is achieved, according to the present invention, by employing a color picture tube as the cathode-ray tube of target position-finding apparatus, and supplying the three color guns of the picture tube with the echo signals from targets without radial motion, echo signals from targets having a radial component of motion toward the apparatus and echo signals from targets having a radial component of motion away from the apparatus, respectively.

In contrast to the usual cathode-ray tubes which are used in sonar or radar, the persistence (afterglow time) of a color tube screen is very short. In order to display and retain a visible picture on the color screen, it is therefore necessary to store, and repeatedly read out, the echo signal information during the period of at least one sounding (the period between the receipt of successive echo signals). It is advantageous, in fact, to store and repeatedly read out the information for a plurality of sounding periods since, as is well known, the resulting display on cathode-ray tube screen will be easier to interpret. Moving objects or targets will then appear as a series of adjacent points on the screen so that, during the course of the storage period, they will form a luminous line.

BRIEF DESCRIPTION OF THE DRAWING

The single FIGURE is a schematic diagram of a preferred embodiment of the circuit, according to the present invention, for displaying received echo signals on the screen of a color picture tube.

DESCRIPTION OF THE PREFERRED EMBODIMENTS

Referring now to the drawing, the single figure shows a three color sonar display device according to a preferred embodiment of the present invention. This display device is connected to the receiver 1 or a panorama sonar system of the type utilized with a PPI display. Such a receiver is well known in the art (see, for example, "Principles and Applications of Underwater Sound," *Government Research Report*, PB 161,682, Summary Technical Report of Division 6, NDRC, Vol. 7 (1946), Chapter 11) and is provided with the signal outputs $R_1$–$R_n$ for the individual preformed beams (corresponding to the outputs $K_1$–$K_{48}$ in the related application referred to above).

Each of the outputs $R_1$–$R_n$ is connected to a group of three filter networks $2_1$, $2_2$ and $2_3$ which separate the received signals in terms of their frequency. In particular, the frequency of the signal appearing at each output R is passed to one of three channels, depending upon whether its frequency is lower, equal to or greater than the frequency of the transmitted sonar signal. This filtering may be accomplished, for example, by employing the technique known as "Own Doppler Nullification" or ODN (see, for example, "Principles and Applications of Underwater Sound," supra, page 180).

After division into the three channels, the echo signals of each of the individual preformed beams received during one sounding period are written into a three-channel storage device. Although any well-known storage device may be used for this purpose, it has proven especially practical to employ three scan conversion storage tubes $3_1$, $3_2$ and $3_3$, as shown in the figure. These tubes are employed in the manner described in the U.S. Pat. No. 2,702,356 and are described, for example, by M. Knoll and B. Kazan in *Storage Tubes*, Library of Congress Catalog Card No. 52–9368, 1952, Part 4, beginning at page 44. It is advantageous if the information is written spirally onto the storage layer of each storage tube, since it is then possible to employ the PPI display circuitry which is already present in the receiver 1. This circuitry is connected to the write-scan elements of the storage tubes via the conductors 4.

The successive scan of the information on the individual preformed beams is effected by electronic scanning circuits $5_1$, $5_2$ and $5_3$ arranged in each channel. These scanning circuits can be identical to the scanning circuits employed in the receiver 1 for the PPI display.

The target information is displayed in the manner of a television picture by scanning the screen of the color picture tube 6 with a parallel line raster. A beam deflection unit 7 of the type well known in the television art is employed for this purpose; it includes a horizontal sweep generator 7a and a vertical sweep generator 7b. The information written spirally into the storage tubes $3_1$, $3_2$ and $3_3$ is scanned, line by line, by means of the readout circuits $8_1$, $8_2$ and $8_3$ of the respective storage tubes. This readout scan, which takes place in a manner identical to and in synchronism with the display on the screen of the picture tube 6, operates according to the same principles as the read scan in a television camera tube.

The output signals of the scan conversion storage tubes $3_1$, $3_2$ and $3_3$ are supplied via brightness control amplifiers $9_1$, $9_2$ and $9_3$ to the red, green and blue guns $10_1$, $10_2$ and $10_3$, respectively, of the cathode-ray tube 6. It is advantageous if the colors are chosen so that the green gun is connected to the channel which carries the echo signals without a Doppler shift; the red gun to the channel which carries the echo signals with a positive Doppler shift; and the blue gun to the channel which carries the echo signals with a negative Doppler shift. In this way, stationary objects or objects without a radial component will be displayed in green, approaching objects will be displayed in red and receding objects in blue. The intensities of the red, green and blue displays, which are proportional to the respective echo signals received in channels 1, 2 and 3 can be individually controlled.

The present invention can also be applied, in a completely analogous way, to radar systems.

In a modification of the present invention, the circuit may be constructed to continuously modulate the signals in the three color channels in dependence upon the sign and magnitude of the Doppler shift. In this way the echo signals having a strongly positive or negative Doppler shift will be shown only in red or blue, respectively, while the signals having frequencies in the middle range will be displayed with an increasing amount of green, the lower the degree of their Doppler shift.

It is also possible, of course, to choose other color arrangements to display the echo signals. These colors are not even limited to red, green and blue since the cathode-ray tube 6 is capable of displaying any color.

The scan conversion storage tubes 3, which are shown in the figure and described above, can also be replaced by any other suitable storage circuit known in the art. For example, it is possible to realize the apparatus according to the present invention with a magnetic tape storage device or, if the target information is digitalized, with a magnetic core storage having corresponding write-in and readout circuits.

It will be understood that the above description of the present invention is susceptible to various modifications, changes and adaptations.

We claim:

1. In a target position-finding apparatus of the type employing echo signals to display a true map-scale image of targets on a cathode-ray tube screen, the improvement comprising:
   a. a three-color cathode-ray tube, having three inputs, one for each respective color;
   b. first means connected to one of said inputs for supplying a display signal only from echo signals having no Doppler shift whereby targets having no radial motion with respect to said position-finding apparatus are displayed in one color;
   c. second means connected to a second of said inputs for supplying a display signal only from echo signals having positive Doppler shift whereby targets having a radial motion away from said position-finding apparatus are displayed in a second color; and
   d. third means connected to a third of said inputs for supplying a display signal only from echo signals having negative Doppler shift whereby targets having a radial motion toward said position-finding apparatus are displayed in a third color.

2. In a target position-finding apparatus of the type employing echo signals to display a true map-scale image of targets on a cathode-ray tube screen, the improvement comprising, in combination:
   a. receiver means for producing a plurality of discrete output signals at respective outputs thereof, one of said output signals being representative of echo signals obtained from objects which are substantially stationary with respect to said receiver means, and two others being representative of echo signals respectively with positive and negative Doppler shift obtained from objects which have relative movement with respect to said receiver means;
   b. a multicolor cathode-ray tube having a plurality of electron guns for producing spots of respectively different colors, each electron gun being connected to a different one of said outputs of the receiver means whereby the intensities of the corresponding spots are in accord with the respective output signals of the receiver means; and
   c. means for controlling said electron guns to produce a PPI display on said tube.

3. In a target position-finding apparatus of the type employing echo signals to display a true map-scale image of targets on a cathode-ray tube screen, the improvement comprising, in combination:
   a. a multicolor cathode-ray tube having separate means for producing each of three spots of different colors;
   b. means for periodically deflecting said spots to provide a PPI display on said tube; and
   c. receiver means for controlling the intensities of said spots so that the different colors and intensities of said PPI display provide different intelligence data, said receiver means having three different outputs connected to the separate means for producing each of the three spots such that each spot is controlled solely by a different one of said outputs, one of said outputs being representative of echo signals returned without Doppler shift, a second output being representative of echo signals returned with positive Doppler shift, and a third output being representative with echo signals returned with negative Doppler shift.

4. In a target position-finding apparatus of the type employing echo signals to display a true map-scale image of targets on a cathode-ray tube screen, the improvement comprising, in combination:
   a. receiver means having a target echo output;
   b. means for separating said output into three components respectively corresponding to echo signals returned with no Doppler shift, echo signals returned with positive Doppler shift, and echo signals returned with negative Doppler shift;
   c. means for storing time-separated values of said components;
   d. a multicolor cathode-ray tube having three electron guns for producing spots of respectively different colors;
   e. means for scanning said electron guns at a rate which is much faster than the rate at which the time-separated values of said components are stored; and
   f. means for controlling the intensity of the spot produced by each electron gun according to the stored value of a respective component.

5. In the target position-finding apparatus according to claim 4, said receiver means having a plurality of outputs corresponding to individual preformed beams.

* * * * *